United States Patent
Mangalindan (10) Patent No.: US 8,117,351 B1
(45) Date of Patent: Feb. 14, 2012

(54) SERIAL PARALLEL INTERFACE FOR DATA WORD ARCHITECTURE

(75) Inventor: Paolo Mangalindan, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 116 days.

(21) Appl. No.: 12/647,879

(22) Filed: Dec. 28, 2009

(51) Int. Cl.
*G06F 3/00* (2006.01)
*G06F 15/00* (2006.01)

(52) U.S. Cl. .............. 710/9; 710/3; 710/36; 710/52; 712/1; 712/200; 712/300

(58) Field of Classification Search .................. None
See application file for complete search history.

(56) References Cited

U.S. PATENT DOCUMENTS

| | | | | |
|---|---|---|---|---|
| 4,547,849 A | * | 10/1985 | Louie et al. | 710/3 |
| 2010/0113095 A1 | * | 5/2010 | Carmon et al. | 455/561 |

* cited by examiner

*Primary Examiner* — Alan Chen
(74) *Attorney, Agent, or Firm* — Berkeley Law & Technology Group, LLP (57) ABSTRACT

Subject matter disclosed herein relates to techniques involving transitioning serial data into a serial parallel interface.

20 Claims, 5 Drawing Sheets

SERIAL PARALLEL INTERFACE FOR DATA WORD ARCHITECTURE

BACKGROUND

Field

Subject matter disclosed herein relates to techniques involving transitioning serial data into a serial parallel interface.

Information

A Serial Peripheral Interface (SPI, or SPI interface) may be used for synchronous serial communication among a host processor and one or more peripheral devices, for example. Upon receiving serial data, a SPI interface may convert such data into a parallel configuration having a particular granularity. To explain by example, a SPI interface may convert sequences of eight serial bits (one byte) provided on a SPI interface input port into parallel bytes of data. An SPI interface may also include additional input ports so that one bit may be received at one input port, two bits may be received at two input ports, three bits may be received at three input ports, and so on. Such data may comprise write data to be stored in a non-volatile memory array. Accordingly, such data bytes may be shifted into a SPI interface with a data byte granularity. On the output side of a SPI interface, such data bytes may be written to a memory array using a same granularity. Problems may occur if data provided to a SPI interface input port is configured with a granularity that is different from a granularity for which a SPI interface and/or a memory array on the output side of a SPI interface are designed.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments described herein include processes and/or electronic architecture involving a serial peripheral interface (SPI) to write to a memory, such as a nonvolatile memory array, for example. In particular, such writing to a nonvolatile memory array may be based, at least in part, on data byte locations despite a SPI interface having an internal architecture where data is accessed by words. For example, a SPI interface may be configured to operate with data having an eight-bit (byte) granularity. However, such a SPI interface may provide output data to a nonvolatile memory array having a sixteen-bit (word) granularity. Accordingly, such a transition of data from one granularity to another granularity will be described below.

In an embodiment, a write process involving a SPI interface may include a particular sequence of providing data to be written and an associated address where such data is to be written. For example, a byte-size address indicating a location in which to write data may be provided before such data is provided. Subsequent to the address being provided and latched into a SPI interface, data may be provided to the SPI interface. As such data may be received into the SPI interface, the initially-provided address may be internally incremented to increasing byte locations as data continues to be received. In one implementation, a write process may include receiving a start byte address, incrementing such an address, collect bytes of data that are serially shifted in during the write process, and generate a word of data with a corresponding word address and/or data-masking signals, as explained below. Herein, serial data comprises data bits that are arranged consecutively on a single line (e.g., one bit at a time), though two or more sequences of such serial data may be received at an SPI interface on two or more parallel lines.

In an embodiment, a SPI controller may act as an interpreter between received serial data and a parallel word-aligned internal architecture of a SPI interface. Subsequent to serially receiving starting byte address bits associated with a write command to write one or more bytes of data, a SPI controller may determine whether the starting byte address starts at an even or odd byte location. A SPI controller may then determine where in an internal word-aligned data bus to place bytes of data based, at least in part, on whether the starting byte address starts at an even or odd byte location. Additionally, a SPI controller may generate signals used by a data buffer to determine whether lower and/or upper bytes of the internal word-aligned data bus are to be loaded into the data buffer and subsequently programmed into a nonvolatile memory, for example.

Such a SPI controller, as described above, may provide benefits such as supporting SPI byte-aligned programming techniques while allowing word-aligned architecture of SPI-peripheral components to be maintained. Such SPI-peripheral components may comprise, for example, a data buffer and/or a nonvolatile memory, for example. Such benefits may be directed towards products that support a multi-interface protocol, such as SPI and/or NOR flash, for example, and where a SPI interface may be added to an already existing parallel architecture. Of course, such benefits are merely examples, and claimed subject matter is not so limited.

Figure 1:
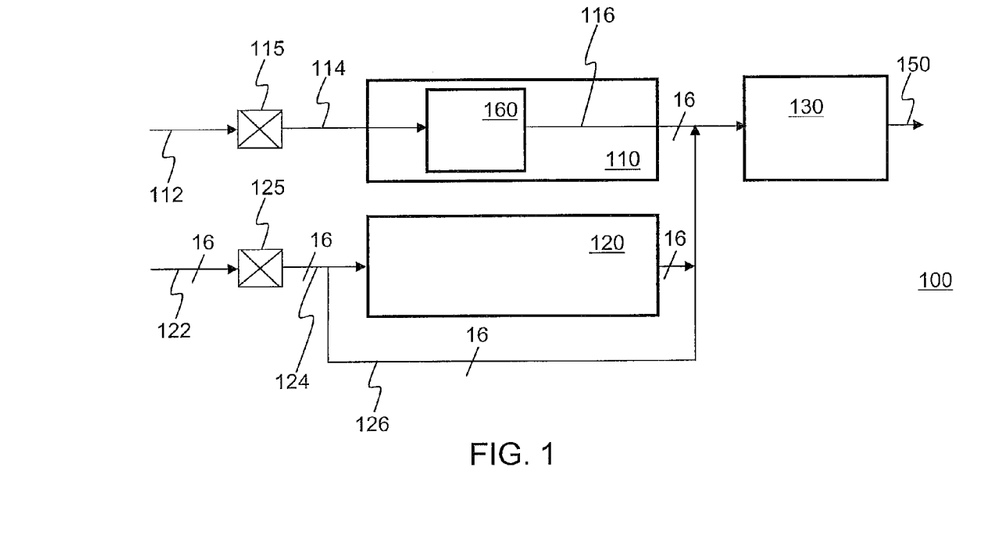
FIG. 1 is a schematic diagram of a Serial Peripheral Interface (SPI), according to an embodiment.

FIG. 1 is a schematic diagram of an interface system 100 including a Serial Peripheral Interface (SPI), according to an embodiment. A user, via a host processor (not shown), for example, may provide a write command that includes data to be written into a nonvolatile memory (not shown) and an address where such data is to be written. Such data and address may be serially received at an input pad 115 via input line 112, for example. Data received at such an input pad may be provided to a SPI interface 110. In particular, such serially received data may be provided to a SPI controller, which may be located in a SPI interface or located external to a SPI interface, and claimed subject matter is not limited in this respect. Though one input line and one pad are shown in FIG. 1, additional lines and pads may be included. For example, an SPI interface may include additional input ports so that one bit may be received at one input port, two bits may be received at two input ports, three bits may be received at three input ports, and so on. After implementing one or more processes, described in greater detail below, SPI controller 160 may provide data onto a 16-bit wide bus 116. For example, data serially received on line 114 may be converted to 16-bit wide parallel data on bus 116. Of course, such parallel data and/or a data bus need not have any particular width: a 16-bit width is merely an example, and claimed subject matter is not limited to any particular width. Next, such parallel data may be provided to a data buffer 130. In one implementation, data stored in data buffer 130 may be provided to a memory, such as a nonvolatile memory (not shown), via output port 150, subsequent to receiving a last data bit on line 114, for example.

In one implementation, system 100 may comprise a NOR flash interface 120. In detail, a user, via a host processor (not shown), for example, may provide a write command that includes data to be written into a nonvolatile memory (not shown) and an address where such data is to be written. Such data and address may comprise a word-wide parallel signal to be received in at an input pad 125 via input line 122, for example. Data received at such an input pad may be provided to NOR flash interface 120. After implementing one or more processes, NOR flash interface 120 may provide data onto a 16-bit wide bus 126. In an alternative implementation, parallel data provided by pad 125 to bus 124 may either be received and processed by NOR flash interface 120 or such parallel data may bypass the NOR flash interface and be received by data buffer 130. Such a path selection may be performed by a multiplexer (not shown) or other switching device, for example. As mentioned above, such parallel data and/or a data bus need not have any particular width: a 16-bit width is merely an example, and claimed subject matter is not limited to any particular width. Next, such parallel data may be provided to a data buffer 130. In one implementation, data stored in data buffer 130 may be provided to a nonvolatile memory (not shown) via output 150, subsequent to receiving a last data bit on line 114, for example. Of course, such details of a system including a SPI interface are merely examples, and claimed subject matter is not so limited.

Figure 2:
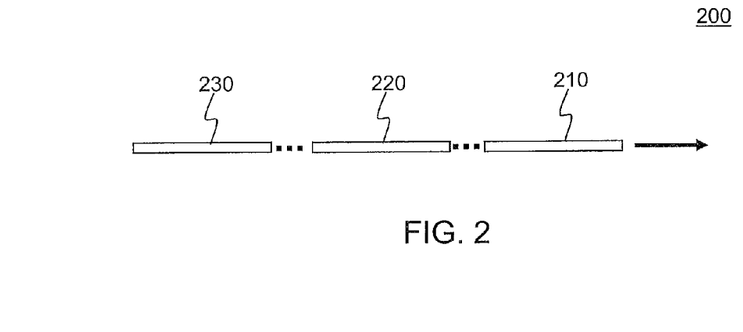
FIG. 2 is a schematic diagram of serial data, according to an embodiment.

FIG. 2 is a schematic diagram of serial data 200, according to an embodiment. Such data may be similar to serial data provided to SPI controller 160 from line 114, shown in FIG. 1, for example. In such a case, a first portion of such serial data may comprise an address 210 to specify a location in a memory where data is to be stored. In one implementation, address 210 may comprise one byte of serial address bits. A lowest-significant bit (LSB) of a byte of address 210 may be used by a SPI controller to determine whether address 210 specifies an odd address or an even address. Such a determination may be used in processes described below. Following address 210, serial data 220 may subsequently be received by a SPI controller, for example. In one particular implementation, data 220 may comprise eight serial bits or a serial byte, though claimed subject matter is not limited to any particular number of bits. Another byte of serial data 230 may follow data 220. Bytes 220 and 230 may be described as odd or even based, at least in part, on the order of placement of such bytes on serial data 200. For example, being a first byte following address 210, byte 220 may be called odd. Accordingly, byte 230 may be called even. Continuing, subsequent byte 240 may be called odd and byte 250 may be called even, and so on. Thus, serial data 200 may comprise a plurality of serial data bits arranged in an eight bit or byte granularity. For example, additional data may follow serial data 250, though not shown.

Figure 3:
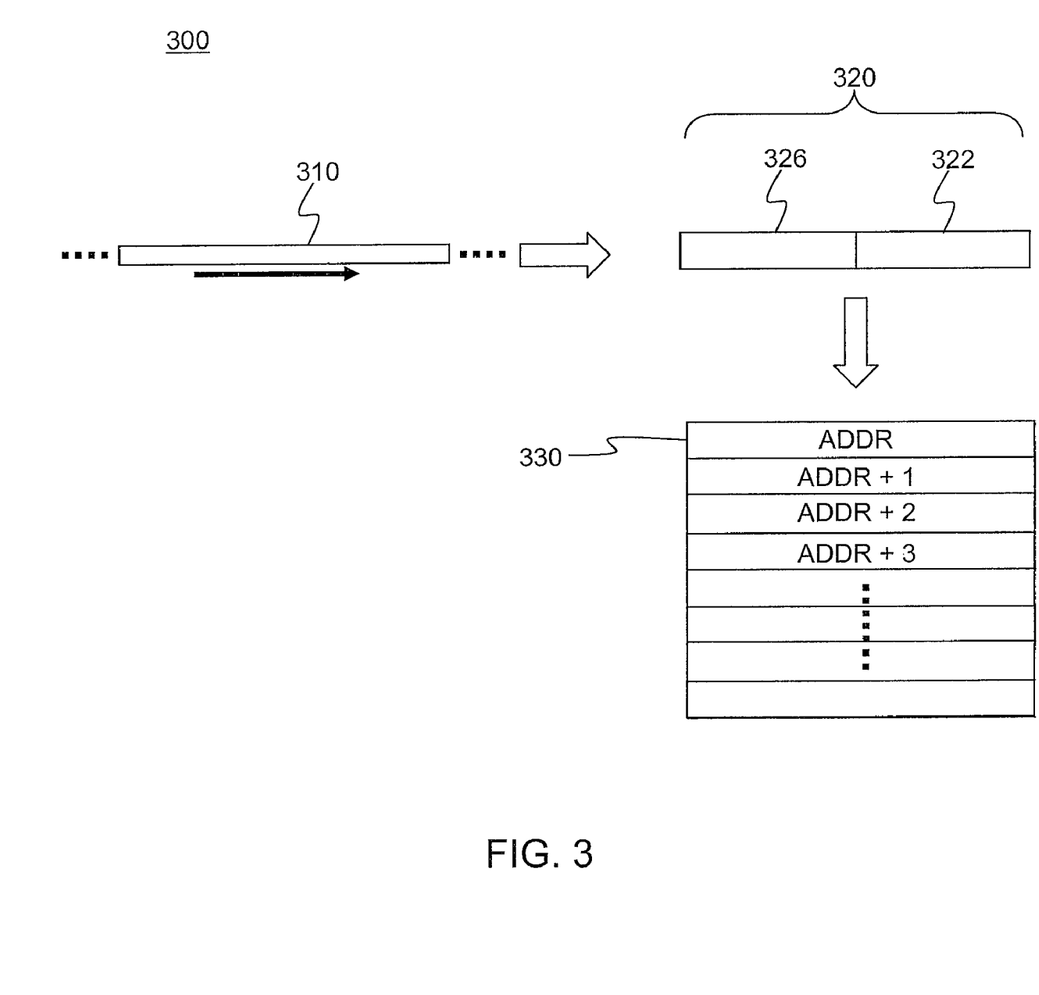
FIG. 3 is a schematic diagram of data flow in a SPI interface, according to an embodiment.

FIG. 3 is a schematic diagram of data flow 300 in a SPI interface, according to an embodiment. Serial data 310, which may be provided by a host processor to be stored in a memory, may be similar to data 200 shown in FIG. 2, for example. In such a case, data 310 may begin with a header comprising a byte of address bits followed by a serial plurality of data bytes. Data 310, having byte granularity, may be loaded onto a bus 320 having word granularity. Bus 320 may comprise a lower byte 322 and an upper byte 326 of the "word-aligned" bus. A SPI controller, such as SPI controller 160 shown in FIG. 1, for example, may determine whether particular serial bytes of data 310 are to be loaded into lower byte 322 or upper byte 326, as explained in detail below. Subsequent to loading at least a portion of bus 320 with data 310, data on bus 320 may be shifted into a data buffer 330. Such a data buffer may be similar to data buffer 130 shown in FIG. 1, for example. A first portion of data to be shifted into data buffer 330 may be stored at an initial address of the data buffer. Such an initial address may be based, at least in part, on a byte of address bits in a header of data 310. Subsequent to such an initial address, additional data, having a word granularity, may be stored at addresses that are self-incrementing starting at the initial address. That is, each additional word of data may be stored at an address above and adjacent to an address where previous data is stored, for example. Of course, claimed subject matter is not limited to any such particular addressing process.

In an embodiment, a SPI controller may implement a process to convert serial data having a first granularity to parallel data having a second granularity. For example, such a process may convert serial data having byte granularity to parallel data having word granularity. Although such a particular example is illustrated herein in detail, claimed subject matter is not limited to any such particular granularity size. Such a converting process may include determining whether particular serial bytes of data are to be loaded into a lower or an upper byte of a word-aligned data bus. Such a process of loading particular bytes of data into either a lower or an upper byte of a word-aligned data bus may be performed in order to match the number of incoming serial bits (in units of bytes, for example) with the number of outgoing parallel bits (in units of words, for example). Table 1 lists criteria that may be followed during such a process of loading bytes of data into a word-aligned data bus, according to an embodiment.

TABLE 1

| Case | Starting byte address | Criteria | Signal to load the lower byte of word | Signal to load the upper byte of word |
|---|---|---|---|---|
| 1A | Even | The odd data bytes (e.g., 1st, 3rd, 5th, etc.) shifted into the SPI controller are loaded on the lower byte of the word-aligned data bus. | 1 | 0 |
| 1B | Even | The even data bytes (e.g., 2nd, 4th, 6th, etc.) shifted into the SPI controller are loaded on the upper byte of the word-aligned data bus. | 1 | 1 |

TABLE 1-continued

| Case | Starting byte address | Criteria | Signal to load the lower byte of word | Signal to load the upper byte of word |
|---|---|---|---|---|
| 2A | Odd | The first data byte shifted into the SPI controller is loaded on the upper byte of the word-aligned data bus. | 0 | 1 |
| 2B | Odd | The odd data bytes (e.g., 3rd, 5th, etc.) shifted into the SPI controller are loaded on the upper byte of the word-aligned data bus. | 1 | 1 |
| 2C | Odd | The even data bytes (e.g., 2nd, 4th, 6th, etc.) shifted into the SPI controller are loaded on the lower byte of the word-aligned data bus. | 1 | 0 |

Subsequent to serially receiving starting byte address bits associated with a write command to write one or more bytes of data, a SPI controller may determine whether the starting byte address starts at an even or odd byte location. For example, such a determination may be based, at least is part, on the LSB of the starting byte address. Table 1 lists particular processes corresponding to whether the LSB is even or odd. Such processes involve loading particular bytes of serial data onto a word-aligned data bus. Such particular bytes of serial data comprise odd or even bytes. Here, a byte may be odd or even based on the order that the byte is received among serial data, as described above. For example, the first byte of serial data following the address byte header of a sequence of serial data may be the first or odd data byte. The next byte of serial data may be an even byte. Accordingly, subsequent bytes are alternately odd and even. Thus, referring to case 1A in Table 1, if the LSB of the starting byte address is even, then odd data bytes (e.g., 1st, 3rd, 5th, etc.) shifted into a SPI controller may be loaded on a lower byte of a word-aligned data bus, such as bus 320, for example. Table 1 also lists a signal or flag to specify whether or not a lower and/or upper byte of a word-aligned data bus is to be loaded into a data buffer, such as data buffer 130 shown in FIG. 1, for example. Thus, for case 1A, the lower byte of a word-aligned data bus is to be loaded into a data buffer, but the upper byte is not to be loaded into the data buffer. Instead, in one implementation, a byte that is not to be loaded into a data buffer may be masked. For example, for case 1A, the upper byte may be masked so that all eight bits are ones (e.g., hexadecimal FF). Accordingly, such mask bits may act as placeholders in a word-aligned data bus in case only one of the upper or lower byte is to be loaded into a data buffer, since a process of loading data from a word-aligned data bus to a data buffer may be performed for byte pairs, in order to correspond to a word length.

Continuing with case 1B for even LSB of the starting byte address, even data bytes (e.g., 2nd, 4th, 6th, etc.) shifted into the SPI controller may be loaded on an upper byte of a word-aligned data bus. As described above, Table 1 also lists a signal or flag to specify whether or not a lower and/or upper byte of a word-aligned data bus is to be loaded into a data buffer. Thus, for case 1B, both lower and upper bytes of a word-aligned data bus are to be loaded into a data buffer.

Referring to case 2A in Table 1, if the LSB of the starting byte address is odd, then the first data byte shifted into the SPI controller may be loaded on the upper byte of the word-aligned data bus. Also, the upper byte of a word-aligned data bus is to be loaded into a data buffer while the lower byte is to be masked, as described above. Referring to case 2B, the odd data bytes (e.g., 3rd, 5th, etc.) shifted into the SPI controller may be loaded on the upper byte of the word-aligned data bus. Also, both the lower and upper bytes of a word-aligned data bus are to be loaded into a data buffer. Referring to case 2C, even data bytes (e.g., 2nd, 4th, 6th, etc.) shifted into the SPI controller may be loaded on the lower byte of the word-aligned data bus. Also, the lower byte of a word-aligned data bus is to be loaded into a data buffer, but the upper byte is not to be loaded into the data buffer.

Figure 4:
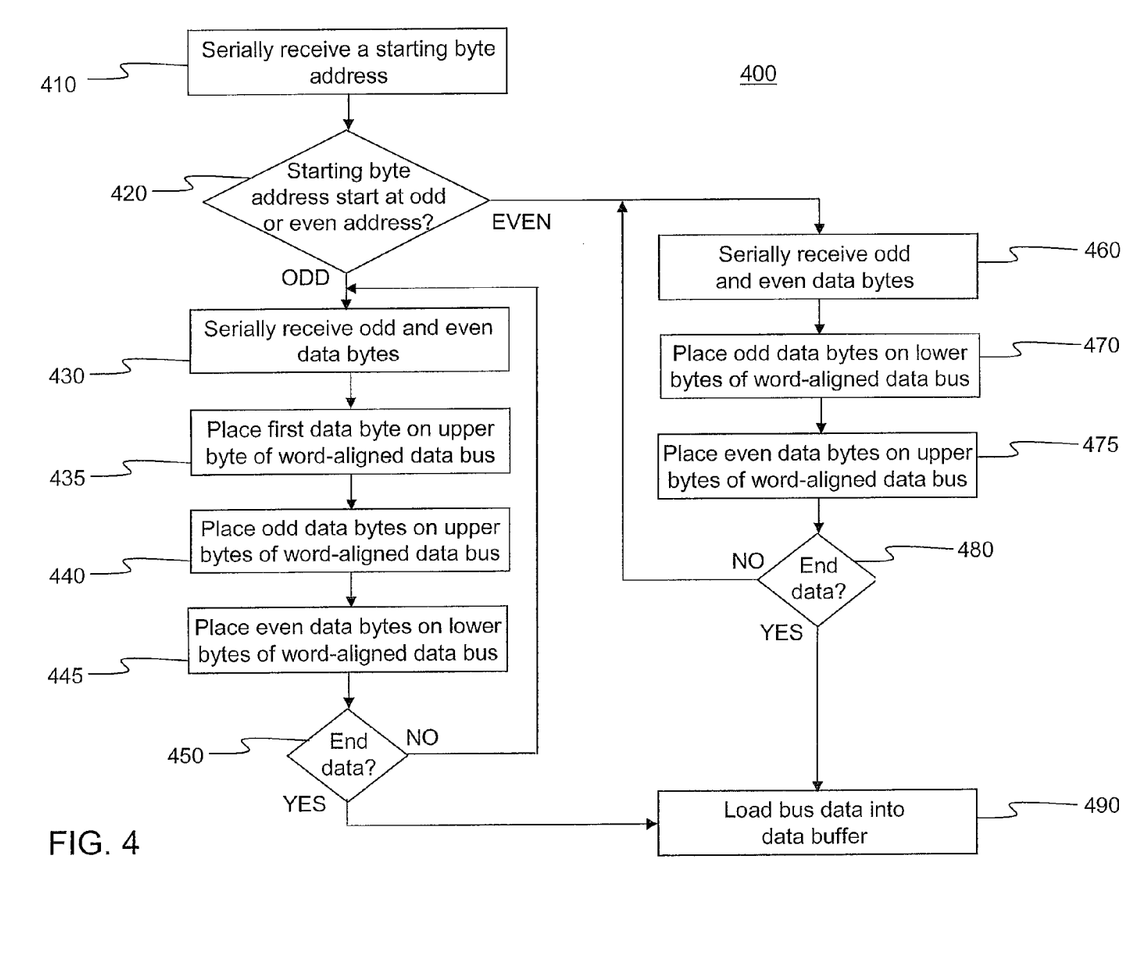
FIG. 4 is a flow diagram of a program process of a SPI controller, according to an embodiment.

FIG. 4 is a flow diagram of a program process 400 of a SPI controller, according to an embodiment. As described above, such a process may involve loading particular bytes of serial data onto a word-aligned data bus. Such particular bytes of serial data comprise odd or even bytes, wherein odd bytes alternate with even bytes and vise versa. At block 410, a SPI controller may serially receive a starting byte address, which may comprise a header of a sequence of serial data bytes, for example. As described above, such a starting byte address may, for example, be associated with a write command to write one or more bytes of the data, though claimed subject matter is not so limited. For example, in one implementation, such a starting byte address may be associated with providing instructions and/or parameters for operations of the SPI controller or other portion of an SPI interface. At diamond 420, a SPI controller may determine whether the starting byte address starts at an even or odd byte location. For example, such a determination may be based, at least in part, on an LSB of a starting byte address. If such a starting byte address is even, then process 400 may proceed to block 460, where a SPI controller may begin to receive odd and even data bytes of serial data. At block 470, odd data bytes may be loaded on a lower byte of a word-aligned data bus, such as bus 320, for example. At block 475, even data bytes may be loaded on the upper byte of the word-aligned data bus. At block 480, data on the word-aligned data bus may be shifted into a data buffer. At diamond 485, if serial data continues to be received, then process 400 may return to block 460 to repeat the process of placing data bytes in either a lower or a higher byte, as described above. If, however, there is no further data, then process 400 may proceed to block 490, where data stored in the data buffer may be written to a memory such as a non-volatile memory, or other function may be performed using the data stored in the data buffer, for example.

On the other hand, if such a starting byte address is odd, as determined at block 420, then process 400 may proceed to block 430, where an SPI controller may begin to receive odd and even data bytes of serial data. At block 435, the first data byte shifted into an SPI controller may be loaded on the upper byte of the word-aligned data bus. At block 440, odd data bytes may be loaded on the upper byte of the word-aligned data bus. At block 445, even data bytes may be loaded on the lower byte of the word-aligned data bus. At block 450, data on the word-aligned data bus may be shifted into a data buffer. At diamond 455, if serial data continues to be received, process 400 may return to block 430 to repeat the process of placing data bytes in either a lower or a higher byte, as described above. If, however, there is no further data, then process 400 may proceed to block 490, where data stored in the data buffer may be written to a memory such as a nonvolatile memory, or other function may be performed using the data stored in the data buffer, for example. Of course, such details of program process 400 are merely examples, and claimed subject matter is not so limited. For example, placement of data bytes on a word-aligned data bus in process 400 may be based, at least in part, on whether the data bytes are odd or even. In another implementation, however, such placement of data bytes on a word-aligned data bus may be based, at least in part, on a position of the data bytes in a series of the data bytes. For example, first, third, fifth, and so on data bytes may be placed on a word-aligned data bus depending, at least in part, on whether a starting byte address is odd or even, as explained above. Second, fourth, sixth, and so on data bytes may be similarly placed on the word-aligned data bus. Accordingly, every other data byte may be treated similarly to one another. Also, the upper byte, lower byte, or both bytes of a word-aligned data bus may be shifted into a data buffer depending, at least in part, on whether a starting byte address is odd or even and/or on a position of data bytes in a series of the data bytes, for example.

Figure 5:
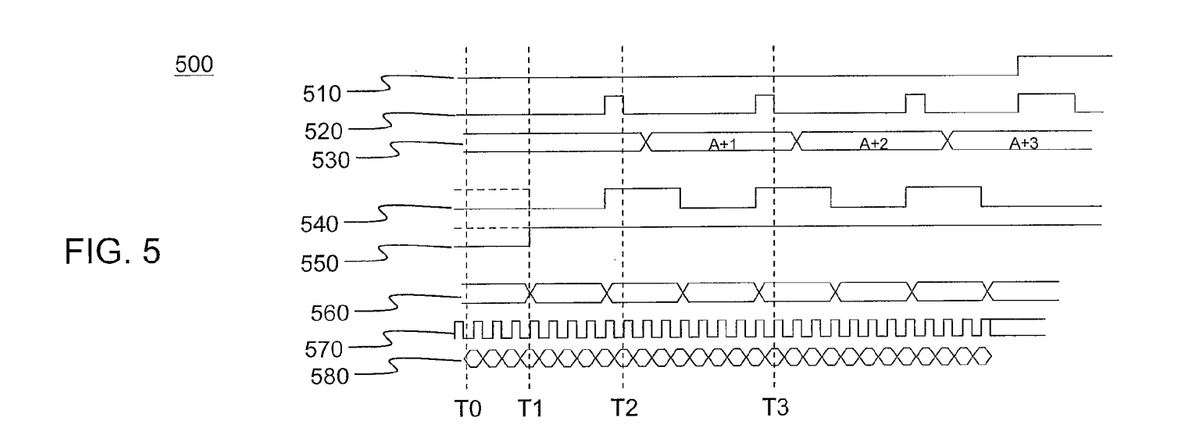
FIG. 5 is a timing diagram of a program process, according to an embodiment.

FIG. 5 is a timing diagram of a programming process 500, according to an embodiment. In this timing diagram, as an example, a starting byte address is even with five data bytes. Waveform 510 represents a signal on a SPI select pad. Waveform 520 represents an internal write strobe to indicate whether an internal word data bus is to be loaded into a data buffer. Waveform 530 represents an internal word address bus. Waveform 540 represents a signal that indicates whether an upper byte of a word on a word-aligned data bus is to be loaded into a data buffer. Waveform 550 represents a signal that indicates if a lower byte of a word on a word-aligned data bus is to be loaded into a data buffer. Waveform 560 represents an internal word data bus. Waveform 570 represents a signal on a SPI clock pad. Waveform 580 represents serial data received at a SPI pad. Other waveforms may be involved, although not shown, in one or more processes described below, and claimed subject matter is not limited in this respect.

At time T0, serial data 580 may be received subsequent to receiving an even starting byte address. At time T1, waveform 550 may be set by a SPI controller so that a lower byte of a word on a word-aligned data bus is to be loaded into a data buffer during a program process of the five data bytes of the present example. Meanwhile, at time t1, waveform 540 may be set to a low value to indicate that data is not to be loaded into a data buffer. In one implementation, states of waveforms 540 and 550 may be considered in case a user may decide to merely load one data byte or an odd number of data bytes and subsequently end the associated command. At time T2, waveform 520 is toggled to shift data on a data bus into a data buffer. Also, waveform 540 may be toggled so that the next upper data byte may be loaded into the data buffer. Waveform 530 indicates that a data buffer address where shifted data is stored is self-incrementing, starting at the starting byte address, as described above. At time T3, a process of shifting data on the data bus into the data buffer may repeat until all five bytes (as in this example) are shifted into the data buffer.

Figure 6:
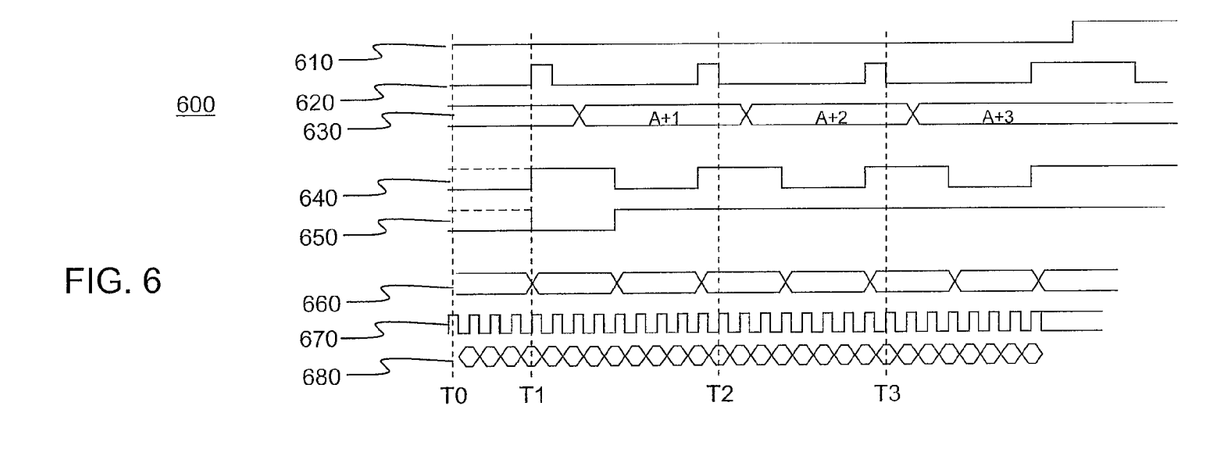
FIG. 6 is a timing diagram of a program process, according to another embodiment.

FIG. 6 is a timing diagram of a program process 600, according to another embodiment. In this timing diagram, as an example, a starting byte address is odd with five data bytes. Waveform 610 represents a signal on a SPI select pad. Waveform 620 represents an internal write strobe to indicate whether an internal word data bus is to be loaded into a data buffer. Waveform 630 represents an internal word address bus. Waveform 640 represents a signal that indicates whether an upper byte of a word on a word-aligned data bus is to be loaded into a data buffer. Waveform 650 represents a signal that indicates whether a lower byte of a word on a word-aligned data bus is to be loaded into a data buffer. Waveform 660 represents an internal word data bus. Waveform 670 represents a signal on a SPI clock pad. Waveform 680 represents serial data received at a SPI pad. Other waveforms may be involved, although not shown, in one or more processes described below, and claimed subject matter is not limited in this respect.

At time T0, serial data 680 may be received subsequent to receipt of an odd starting byte address. Accordingly, a first received byte may be loaded into an upper byte of a data buffer. At time T1, waveform 640 may be set by a SPI controller so that an upper byte of a word on a word-aligned data bus is to be loaded into the data buffer during a program process of the five data bytes of the present example. Meanwhile, at time t1, waveform 650 may be maintained at a low value to indicate that a lower byte of a word on a word-aligned data bus is not to be loaded into a data buffer. In one implementation, states of waveforms 640 and 650 may be considered in case a user may decide to merely load an even number of data bytes and subsequently end the associated command. At time T2, waveform 620 is toggled to shift data on a data bus into a data buffer. Also, waveform 640 may be toggled so that the next upper data byte may be loaded into the data buffer. Waveform 630 indicates that a data buffer address where shifted data is stored is self-incrementing, starting at the starting byte address, as described above. At time T3, a process of shifting data on the data bus into the data buffer may repeat until all five bytes (as in this example) are shifted into the data buffer.

Figure 7:
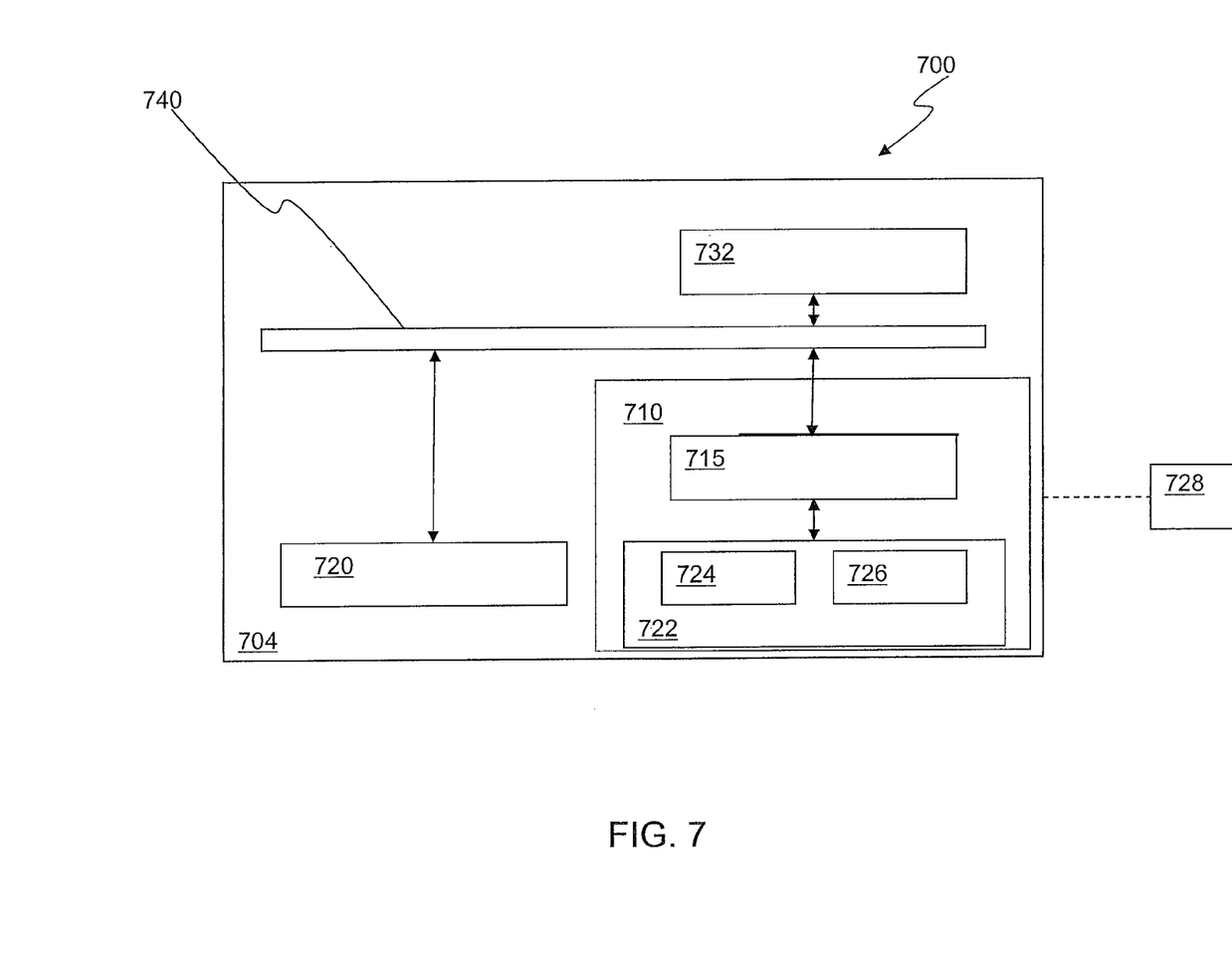
FIG. 7 is a schematic diagram illustrating an exemplary embodiment of a computing system.

FIG. 7 is a schematic diagram illustrating an exemplary embodiment of a computing system 700 including a memory device 710. Such a computing device may comprise one or more processors, for example, to execute an application and/or other code. For example, memory device 710 may comprise a nonvolatile memory or a data buffer such as data buffer 130, shown in FIG. 1. A computing device 704 may be representative of any device, appliance, or machine that may be configurable to manage memory device 710. Memory device 710 may include a memory controller 715 and a memory 722. By way of example but not limitation, computing device 704 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system; and/or any combination thereof.

It is recognized that all or part of the various devices shown in system 700, and the processes and methods as further described herein, may be implemented using or otherwise including hardware, firmware, software, or any combination thereof. Thus, by way of example but not limitation, computing device 704 may include at least one processing unit 720 that is operatively coupled to memory 722 through a bus 740 and a host or memory controller 715. Processing unit 720 is representative of one or more circuits configurable to perform at least a portion of a data computing procedure or process. By way of example but not limitation, processing unit 720 may include one or more processors, controllers, microprocessors, microcontrollers, application specific integrated circuits, digital signal processors, programmable logic devices, field programmable gate arrays, and the like, or any combination thereof. Processing unit 720 may include an operating system configured to communicate with memory controller 715. Such an operating system may, for example, generate commands to be sent to memory controller 715 over bus 740. Memory controller may comprise a SPI controller such as SPI controller 160 shown in FIG. 1, for example. In response to a write command, for example, memory controller 715 may serially receiving an eight-bit byte of data associated with a plurality of address bits that represent a starting byte address of a serial peripheral interface (SPI) data buffer. Subsequently, memory controller 715 may determine a location to place the byte of data on a sixteen-bit word-aligned data bus based, at least in part, on whether the starting byte address starts at an even or an odd address of the SPI data buffer, wherein the location of the word-aligned data bus comprises a lower byte and an upper byte of a byte-pair.

Memory 722 is representative of any data storage mechanism. Memory 722 may include, for example, a primary memory 724 and/or a secondary memory 726. Primary memory 724 may include, for example, a random access memory, read only memory, etc. While illustrated in this example as being separate from processing unit 720, it should be understood that all or part of primary memory 724 may be provided within or otherwise co-located/coupled with processing unit 720.

Secondary memory 726 may include, for example, the same or similar type of memory as primary memory and/or one or more data storage devices or systems, such as, for example, a disk drive, an optical disc drive, a tape drive, a solid state memory drive, etc. In certain implementations, secondary memory 726 may be operatively receptive of or otherwise configurable to couple to, a computer-readable medium 728. Computer-readable medium 728 may include, for example, any medium that can carry and/or make accessible data, code, and/or instructions for one or more of the devices in system 700.

Computing device 704 may include, for example, an input/output 732. Input/output 732 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 732 may include an operatively configured display, speaker, keyboard, mouse, trackball, touch screen, data port, etc.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
    serially receiving a byte of data associated with a plurality of address bits that represent a starting byte address of a serial peripheral interface (SPI) data buffer; and
    determining whether to place said byte of data on a lower byte or an upper byte of a word-aligned data bus based, at least in part, on whether said starting byte address comprises an even address or an odd address of said SPI data buffer.

2. The method of claim 1, further comprising:
    determining whether to write said lower and/or said upper byte of said word-aligned data bus to said SPI data buffer based, at least in part, on whether said starting byte address comprises an even address or an odd address of said SPI data buffer.

3. The method of claim 2, further comprising serially receiving a plurality of data bytes associated with said starting byte address, wherein said plurality of data bytes comprises odd data bytes and even data bytes.

4. The method of claim 3, further comprising:
    placing said odd data bytes on said lower bytes of said word-aligned data bus if said starting byte address comprises an even address of said SPI data buffer.

5. The method of claim 3, further comprising:
    placing said even data bytes on said upper bytes of said word-aligned data bus if said starting byte address comprises an even address of said SPI data buffer.

6. The method of claim 3, further comprising:
    placing said odd data bytes on said upper bytes of said word-aligned data bus if said starting byte address comprises an odd address of said SPI data buffer.

7. The method of claim 3, further comprising:
    placing said even data bytes on said lower bytes of said word-aligned data bus if said starting byte address comprises an odd address of said SPI data buffer.

8. The method of claim 1, further comprising:
    writing data stored in said SPI data buffer into a nonvolatile memory if an end of said serially-received data is reached.

9. A apparatus comprising:
    a controller to:
    serially receive a byte of data associated with a plurality of address bits that represent a starting byte address of a serial peripheral interface (SPI) data buffer; and
    determine whether to place said byte of data on a lower byte or an upper byte of a word-aligned data bus based, at least in part, on whether said starting byte address comprises an even address or an odd address of said SPI data buffer.

10. The apparatus of claim 9, said controller to determine whether to write said lower and/or said upper byte of said location of said word-aligned data bus to said SPI data buffer based, at least in part, on whether said starting byte address comprises an even address or an odd address of said SPI data buffer.

11. The apparatus of claim 9, said controller to serially receive a plurality of data bytes associated with said starting byte address, wherein said plurality of data bytes comprises odd data bytes and even data bytes.

12. The apparatus of claim 11, said controller to place said odd data bytes on said lower bytes of said word-aligned data bus if said starting byte address comprises an even address of said SPI data buffer.

13. The apparatus of claim 11, said controller to place said even data bytes on said upper bytes of said word-aligned data bus if said starting byte address comprises an even address of said SPI data buffer.

14. The apparatus of claim 11, said controller to place said odd data bytes on said upper bytes of said word-aligned data bus if said starting byte address comprises an odd address of said SPI data buffer.

15. The apparatus of claim 11, said controller to place said even data bytes on said lower bytes of said word-aligned data bus if said starting byte address comprises an odd address of said SPI data buffer.

16. The apparatus of claim 9, said controller to write data stored in said SPI data buffer into a nonvolatile memory if an end of said serially-received data is reached.

17. A system comprising:
a memory device comprising an array of memory cells, said memory device further comprising a memory controller to:
  in response to a write command, serially receive a byte of data to write to said array of memory cells, said byte of data associated with a plurality of address bits that represent a starting byte address of a serial peripheral interface (SPI) data buffer; and
  determine whether to place said byte of data on a lower byte or an upper byte of a word-aligned data bus based, at least in part, on whether said starting byte address comprises an even address or an odd address of said SPI data buffer; and
a processor to host one or more applications and to initiate said write command to said memory controller to provide access to said memory cells.

18. The system of claim 17, said controller to determine whether to write said lower and/or said upper byte of said location of said word-aligned data bus to said SPI data buffer based, at least in part, on whether said starting byte address comprises an even address or an odd address of said SPI data buffer.

19. The system of claim 17, said controller to serially receive a plurality of data bytes associated with said starting byte address, wherein said plurality of data bytes comprises odd data bytes and even data bytes.

20. The system of claim 17, said controller to write data stored in said SPI data buffer into a nonvolatile memory if an end of said serially-received data is reached.

* * * * *